United States Patent
Nelson (12)

(10) Patent No.: US 6,558,261 B1
(45) Date of Patent: May 6, 2003

(54) ACTUATOR DRIVE AND DISPLAY MECHANISM

(75) Inventor: Marvin D. Nelson, Savage, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/713,092

(22) Filed: Nov. 15, 2000

(51) Int. Cl.$^7$ ................................................. F16D 3/19
(52) U.S. Cl. ........................ 464/89; 464/162; 403/359.4
(58) Field of Search ........................... 464/51, 75, 89, 464/158, 162; 403/298, 359.4

(56) References Cited

U.S. PATENT DOCUMENTS

| | | | |
|---|---|---|---|
| 1,669,283 A | | 5/1928 | Carlson |
| 1,690,052 A | | 10/1928 | Carlson |
| 2,004,299 A | * | 6/1935 | Snyder ........................ 464/75 |
| 2,466,097 A | * | 4/1949 | Graue .................... 464/158 X |
| 2,658,979 A | | 11/1953 | Jungholm |
| 2,725,444 A | | 11/1955 | Grooms ...................... 200/140 |
| 2,774,852 A | | 12/1956 | Boardman .................. 200/172 |
| 3,176,107 A | | 3/1965 | Temple ....................... 200/160 |
| 3,183,684 A | * | 5/1965 | Zeidler ................... 464/162 X |
| 3,193,653 A | | 7/1965 | Cope ............................. 200/166 |
| 3,501,609 A | | 3/1970 | Wilcox et al. .............. 200/172 |
| 3,697,714 A | | 10/1972 | Gryctoko et al. ........... 200/172 |
| 3,699,291 A | | 10/1972 | Danti et al. ................. 200/153 |
| 3,761,649 A | | 9/1973 | Jedynak et al. ............... 200/14 |
| 3,912,896 A | | 10/1975 | Imamura ..................... 200/337 |
| 4,240,763 A | * | 12/1980 | Moore .......................... 464/75 |
| 4,276,758 A | * | 7/1981 | Coman et al. .......... 464/158 X |
| 4,532,386 A | | 7/1985 | Muench, Jr. et al. ......... 200/11 |
| 5,000,610 A | | 3/1991 | Stuhr .......................... 403/167 |
| 5,180,050 A | | 1/1993 | Rada et al. .................. 200/329 |
| 5,223,822 A | | 6/1993 | Stommes et al. ........... 340/686 |
| 5,310,974 A | | 5/1994 | Churchill et al. ........... 200/566 |
| 5,326,944 A | | 7/1994 | Garcia .......................... 200/11 |
| 5,577,603 A | | 11/1996 | Bogdanovs et al. ........ 200/331 |
| 5,927,682 A | | 7/1999 | Gul et al. ...................... 251/77 |
| 5,954,192 A | | 9/1999 | Iitsuka ....................... 200/336 |
| 6,302,800 B1 | * | 10/2001 | Kundermann ........... 464/158 X |
| 6,343,993 B1 | * | 2/2002 | Duval et al. ................ 464/167 |

* cited by examiner

Primary Examiner—Greg Binda (57) ABSTRACT

The present invention relates to a mechanism for rotatably coupling two coaxial shafts while allowing relative movement of the shafts in the X, Y and Z directions. The mechanism includes a female socket and a male fitting. The female socket is attached to one shaft and contains channels. The male fitting is attached to the other shaft and has arms that fit into the channels of the female socket. The mechanism also drives an external visual indicator. The present invention allows an operator to separate the external visual indicator from the mechanism and then reassemble it without losing rotational position readout of the indicator through the action of two axially aligned cams.

21 Claims, 6 Drawing Sheets

ACTUATOR DRIVE AND DISPLAY MECHANISM

BACKGROUND OF THE INVENTION

The present invention relates to an actuator, and more particularly to a drive mechanism providing accurate feedback and to a quick coupling visual indicator for opposed coaxial shafts.

Traditionally, fuel and air valve dampers for boiler applications have only been coupled via mechanical coupling arrangements. Such arrangements were quite complex and cumbersome. In attempting to develop an electronic interlock for such dampers (valves), one hindrance in achieving appropriate coupling was the need for very precise rotational coupling of coaxially aligned shafts in an actuator mechanism.

Known axial coupling or drive mechanisms use pins, tabs and keys as the coupling means for transferring rotary movement from one shaft to another shaft when it is desired to allow relative freedom of movement in the axial direction. However, these known coupling mechanisms do not provide a suitably precise level of positional accuracy for some purposes, and particularly for those where precise electronic interlocking of opposed axial members is desired. In addition, field service and adjustment may be needed from time-to-time for such mechanisms. Accordingly, their reassembly in the field after maintenance and trouble-shooting should be simple and should result in quick and accurate realignment of any mechanical coupling arrangements therein.

BRIEF SUMMARY OF THE INVENTION

The present invention is a mechanism for rotatably coupling two shafts in generally coaxial alignment. The mechanism includes a female socket and a male fitting that allow relative movement of the shafts in the X, Y and Z directions while maintaining precise rotational alignment of the shafts.

In one embodiment, the invention is a mechanism for rotatably coupling a first shaft and a second shaft in generally coaxial alignment which includes a female socket and an opposed male fitting. The female socket is rotatably coupled to the first shaft, and has a generally cylindrical column section with a plurality of equally spaced apart receiving channels defined on an inner circumferential side thereof. The male fitting is rotatably coupled to the second shaft, and has a plurality of radially extended arms thereon. Each arm has at least two circumferentially flexible fingers projecting radially therefrom. The fingers of each arm are slidably received within one of the receiving channels of the female socket, thereby connecting the first and second shafts for coupled rotation, yet allowing limited relative movement of the first and second shafts in the X, Y and Z coordinate directions.

Another aspect of the invention is the affirmative rotational coupling of two shafts in generally coaxial alignment by use of opposed yet biased together cams. The two shafts may be axially disengaged and then readily re-engaged and aligned in their prior rotational alignment, by operation of the engaging cam structures.

While only a single preferred embodiment is set forth in the above drawings, other embodiments are also contemplated, some of which are noted in the following discussion. In all cases, this disclosure presents the illustrated embodiments of the invention as representations, not limitations of the present invention. It is understood that one skilled in the art could devise numerous modifications to the present invention which would still fall within the scope and spirit of the invention.

DETAILED DESCRIPTION

Figure 1:
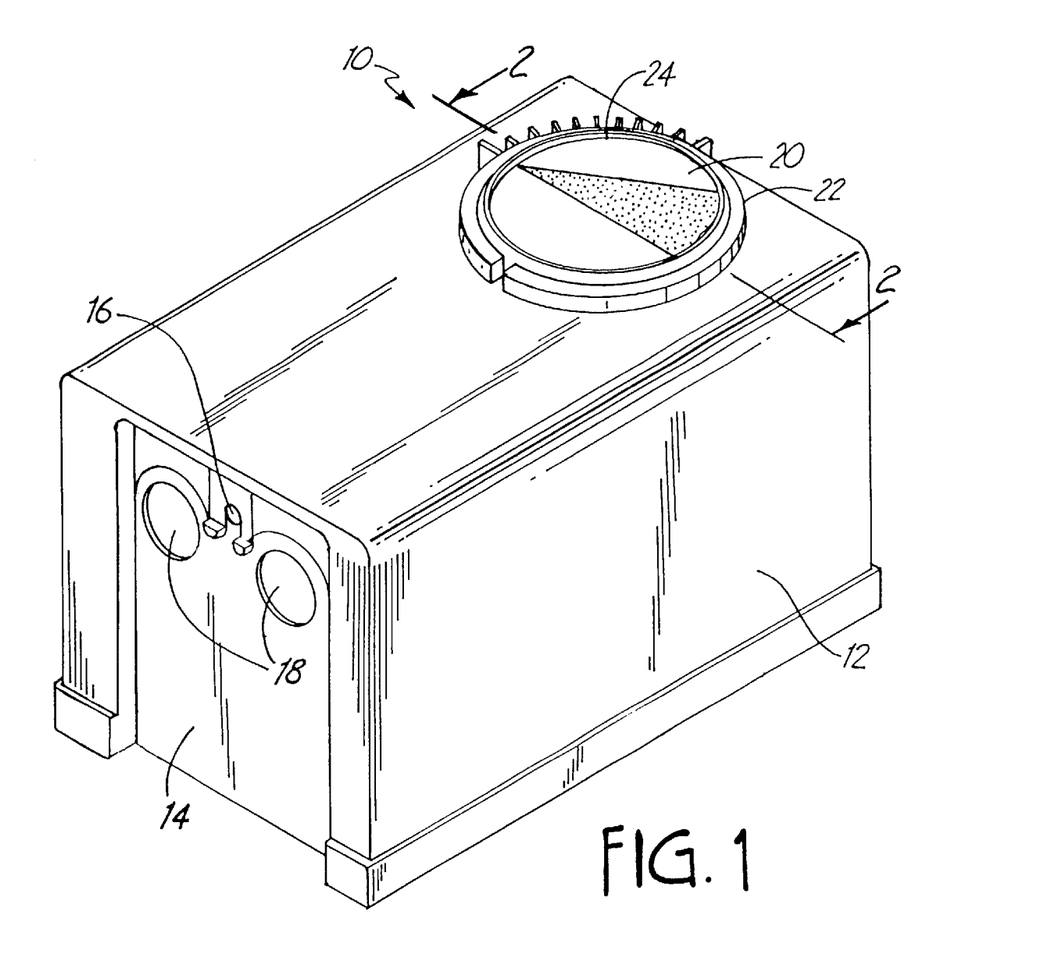
FIG. 1 is a perspective view of an actuator embodying the present invention.

An exemplary valve actuator 10 is shown in FIG. 1, a perspective view of the actuator. The actuator includes an outer cover 12 over an inner case 14, preferably secured with together with one or more suitable fasteners, such as set screw 16. The outer cover 12 has opening exposing access ports 18 in the inner case 14 for connection to power and other system components, such as a remote controller (not shown, typically a computer). The outer cover 12 also has a visual indicator dial 20 set into a raised rim 22 molded into cover 12. The dial 20 has a castellated rim 24 to allow the dial to be grasped and turned. The visual indicator dial 20 is provided to give an operator an indication of the position of the actuator further discussed below.

In the disclosed embodiment, the actuator is designed for use in controlling the fuel-air ratio in large boiler installations. The action of the actuator on a valve is preferably controlled by a remote controller, which may control multiple actuators acting on a single system. A large boiler, for example, would use at least two actuators, one actuator operating a gas valve and a second actuator operating a combustion air damper. A remote controller, connected to both actuators, sends out the actuator position control signals to the actuators, which open or close the corresponding valves. In order to tightly control the boiler system, an accurate feedback signal from the actuator to the remote controller is necessary. The feedback signal is processed by the controller to achieve the desired fuel-to-air ratio.

The actuator preferably includes a precision feedback potentiometer and integral power supply capable of direct line voltage connections, and has a visible position indicator on its cover. A controller and one or more associated actuators form a complete control system. The controller processes sensor feedback information and sends out position control signals to its associated actuators. Since very accurate control of the fuel to air ratio is the objective, an accurate feedback signal is required. This is what accounts for the need for tight rotational tolerance of the potentiometer feedback to the controller.

In one embodiment, the invention is a mechanism for reproducibly coupling a first shaft to a second shaft for coupled rotation in one rotational direction, the inventive mechanism includes a cam mounted to the first shaft and cam plate mounted to the second shaft. The cam plate has a face and shoulder protruding from the face. Likewise, the cam has a face and a shoulder protruding from the face, with the shoulder of the cam being a mirror image of the shoulder of the cam plate. A first spring is coupled to the first shaft to urge the face of the cam in a first axial direction toward the face of the cam plate so that the cam face engages the face of the cam plate. The face of the cam slides in a first rotational direction over the face of the cam plate, with the first spring allowing axial displacement of the cam plate against the spring bias until the shoulders of the cam and cam plate slide over each other and interlock. A second spring is operatively connected to the cam to bias the cam in a second opposite rotational direction to secure the shoulders in an interlocked relation.

Figure 2:
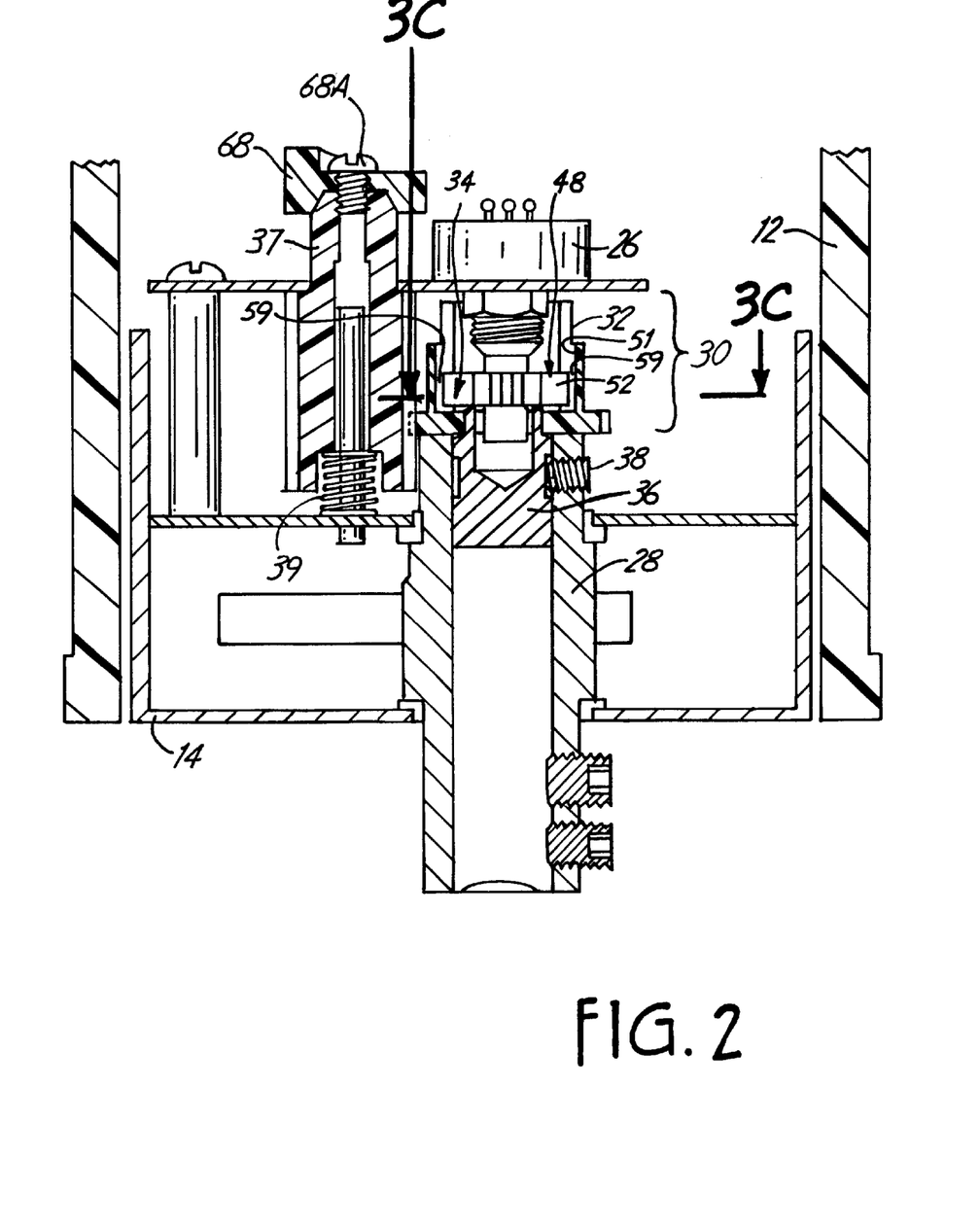
FIG. 2 is a sectional view of a portion of the actuator, as taken along lines 2—2 in FIG. 1.

FIG. 2 is a sectional view of a portion of the actuator. The feedback signal provides information as to the exact position of the actuated valve. The position of the valve (not shown) controlled by the actuator is provided to the remote controller by a potentiometer 26 which is aligned generally coaxially and linked (shaft to shaft) to an actuator output hub 28 (or a shaft) used to drive the valve, as illustrated in FIG. 2. A high positional accuracy between the actuator output hub 28 and the potentiometer 26 is provided by an inventive linkage system 30. Preferably, the inventive linkage system 30 translates rotational movement between the potentiometer 26 and the actuator output hub 28 with a positional accuracy of approximately 0.05%. Accommodating movement of the actuator output hub 28 while maintaining positional accuracy is achieved by driving potentiometer 26 directly and axially from actuator output hub 28, eliminating backlash which occurs between gear stages.

Linkage system 30 is a coupling mechanism comprised of a female socket 32 and a male fitting 34. The socket 32 and fitting 34 are preferably formed from an acetyl polymer material, such as Delrin™ material available from Dupont, that behaves very much like metal. The female socket 32 is coupled to actuator output hub 28 by a connection post 36. The connection post 36 nests inside of actuator output hub 28 and is secured with a set screw 38. A shaft gear column 37 is biased by a spring 39 in the upward position. When initially calibrated, the actuator must be set to a predetermined resistance value. A screwdriver or other equivalent tool means is placed in the upper end of gear column 37 and used to make the calibration. After the calibration is made, set screw 38 is tightened to fix the setting.

Figures 3, 3A, 3B, 3C:
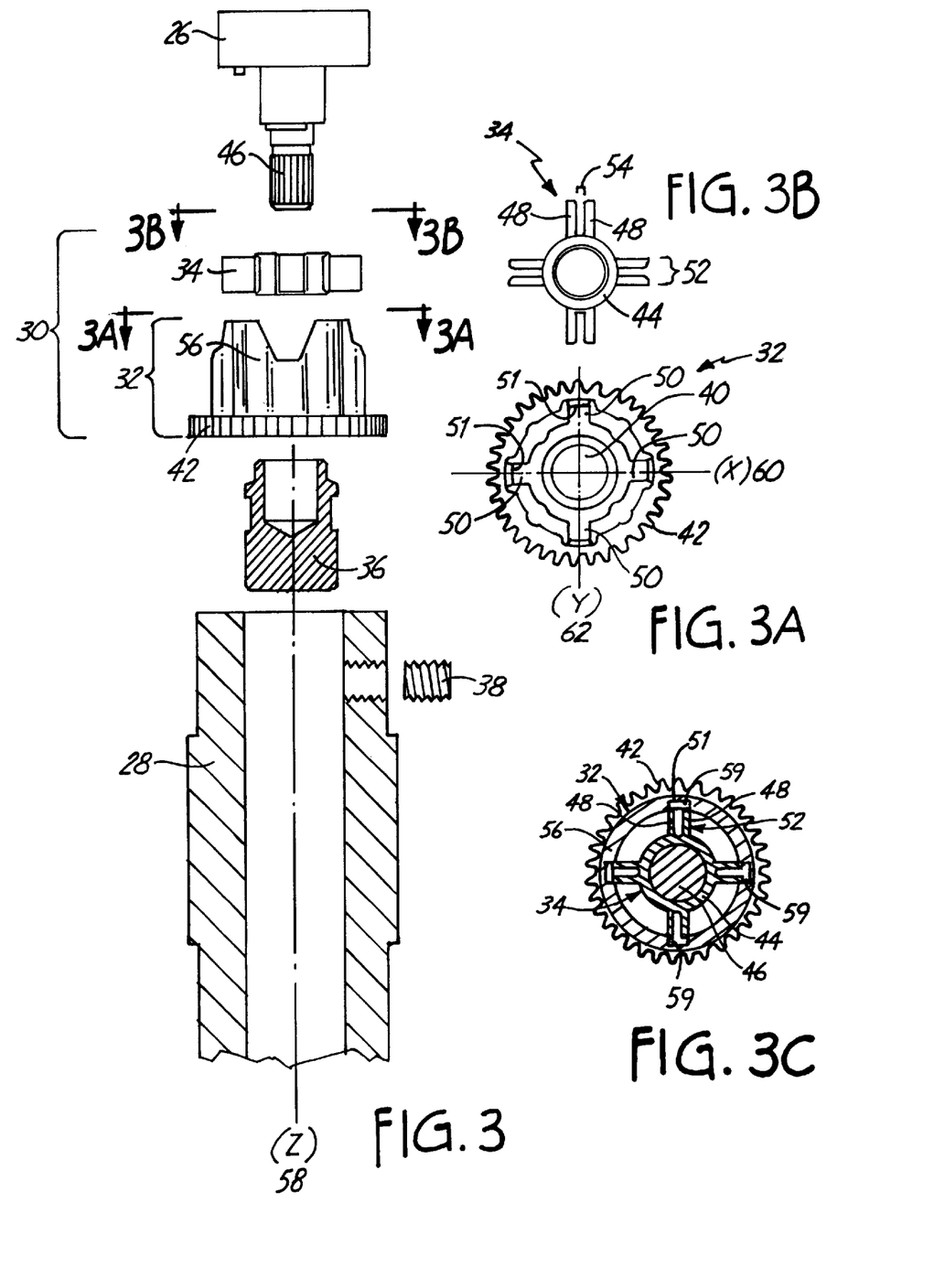
FIG. 3 is an exploded view of the coupling mechanism of the actuator, with some parts shown in section.
FIG. 3A is a top plan view of the female socket of the coupling mechanism.
FIG. 3B is a top plan view of the male fitting of the coupling mechanism.
FIG. 3C is a partial sectional view of the actuator, as taken along lines 3C—3C in FIG. 2.

FIGS. 3, 3A and 3B provide detailed views of the female socket and male fitting respectively. The upper portion of the connection post 36 is knurled so as to create an interference fit inside a central bore 40 of a gear plate or portion 42 on female socket 32, resulting in the interlock of gear plate 42 onto the upper portion of the connection post 36. Likewise, the potentiometer 26 is coupled to a central ring 44 of male fitting 34 as shown in FIG. 3. A rotary shaft 46 (or rotary arm) of potentiometer 26 is knurled to create an interference fit within central ring 44 of the male fitting 34.

FIG. 3 is an exploded view of the coupling mechanism. The male fitting 34 mates inside the female socket 32 in a friction fit for coupled axial rotation. The female socket 32 slidably receives flexible fingers 48 of the male fitting 34 in channels 50 as shown in FIGS. 3A and 3B. The male fitting 34 has four radially extending arms 52 equally spaced apart circumferentially about a central ring 44. The male fitting 34 is preferably approximately 0.775 inches across radially (arm end to arm end) and preferably approximately 0.180 inches thick longitudinally. The central ring 44 has an outer diameter of preferably approximately 0.375 inches and an inner diameter of preferably approximately 0.248 inches. Each arm 52 has a total width of preferably approximately 0.14 inches. Each arm 52 is divided into two approximately 0.005 inches wide fingers 48 with a central gap 54 between adjacent fingers 48 of preferably approximately 0.04 inches.

The female socket 32 has a generally cylindrical column 56 extending coaxially from gear plate 42. The gear plate 42 is preferably approximately 1.062 inches in diameter with the central bore 40 preferably approximately 0.419 inches in diameter. The column 56 is preferably approximately 0.75 inches in diameter and preferably approximately 0.5 inches in height. Column 56 has channels 50 equally spaced apart circumferentially about an inner circumferential side 51 thereof (see FIGS. 2 and 3A). The column 56 and channels 50 are oriented in alignment to longitudinally receive fingers 48 of male fitting 34. The channels 50 are preferably approximately 0.3 inches in height and preferably approximately 0.13 inches in width. The radial distance across the interior of the column 56 of the female socket 32 (from channel 50 to channel 50) is preferably approximately 0.840 inches.

FIG. 3C is a partial sectional view of the actuator, as taken along lines 3C—3C in FIG. 2. The male fitting 34 mates inside the female socket 32 in a friction fit for coupled axial rotation. The flexible fingers 48 extending from the radially extending arms 52 of the male fitting 34 are received by the channels 50 of the female socket. The outer end of each finger 48 does not contact the inner circumferential side 51 of the channels 50 such that radial spaces or gaps 59 are formed therebetween. The knurled rotary shaft 46 (or rotary arm) of potentiometer 26 is coupled to a central ring 44 of male fitting 34 and creates an interference fit within the central ring 44.

A friction fit is created between the fingers 48 of male fitting 34 and the interior of channels 50 of female socket 32 by compressing the fingers 48 together while sliding them longitudinally into channels 50. The friction fit of fingers 48 in channels 50 retains a rotational position between the male fitting 34 and the female socket 32. The male fitting 34 is able to slide axially along the Z-axis 58 (FIG. 3) within the channels 50 while maintaining a friction fit with the female socket 32. A comparison of the channel 50 to channel 50 distance of preferably approximately 0.840 inches with the arm end to arm end distance of preferably approximately 0.775 inches reveals the existence of radial spaces or gaps 59 (see FIG. 2) between the outer ends of the arms 52 or fingers 48 and the inner circumferential side 51 of the channels 50 of the generally cylindrical column 56 (see FIGS. 2 and 3C). The gaps 59 allow the movement of the male fitting 34 along the X-axis 60 and Y-axis 62 (FIG. 3B) relative to the female socket 32 without disrupting the friction fit of the fingers 48 with the female socket 32. The male fitting 34 can thus move in the X, Y and Z directions while maintaining an accurate rotational position alignment with the female socket 32. This in turn permits relative movement of the first and second shafts in the X, Y and Z directions.

The present invention allows for movement in the X, Y and Z directions by the actuator output hub 28, coupled with female socket 32, without that movement affecting the rotary position of the potentiometer 26, coupled with male fitting 34. Mating male fitting 34 with female socket 32 minimizes relative rotary slack by the friction fit between fingers 48 of male fitting 34 received within the channels 50 of female socket 32. Rotational force is transferred from the walls of channels 50 to the fingers 48. Movement of male fitting 34 with respect to female socket 32 in the X, Y and Z directions while maintaining rotational accuracy is accomplished by the increased flexing or relaxing of fingers 48 as they are moved axially within channels 50 by the actuator output hub 26. The size and material of the fingers 48 permit such flexibility. Each finger is circumferentially resiliently received within a respective receiving channel to allow relative movement of the female socket 32 and male fitting 34 in the X, Y and Z directions.

Figure 4:
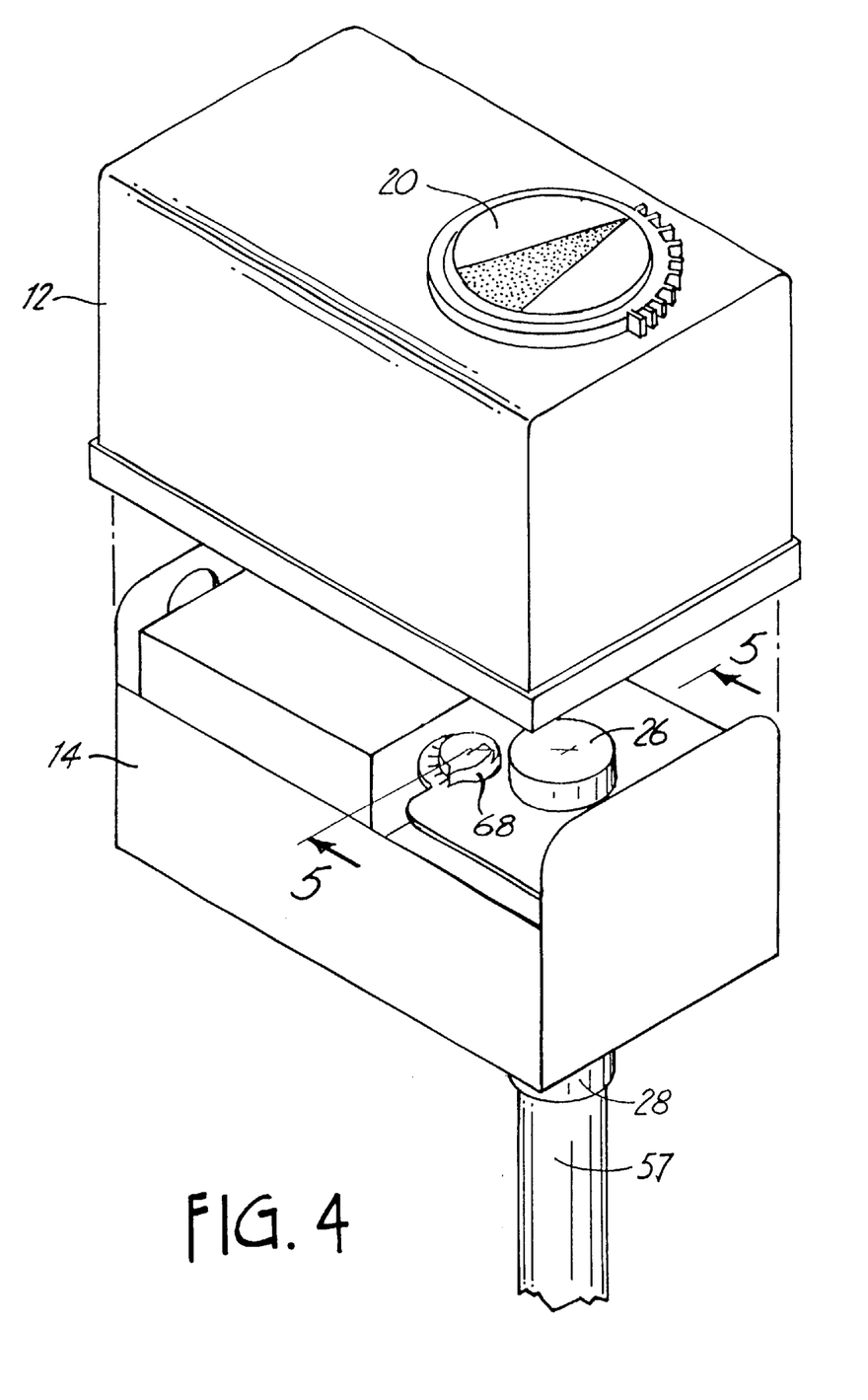
FIG. 4 is a perspective view of the actuator, with the outer cover removed.
Figure 5:
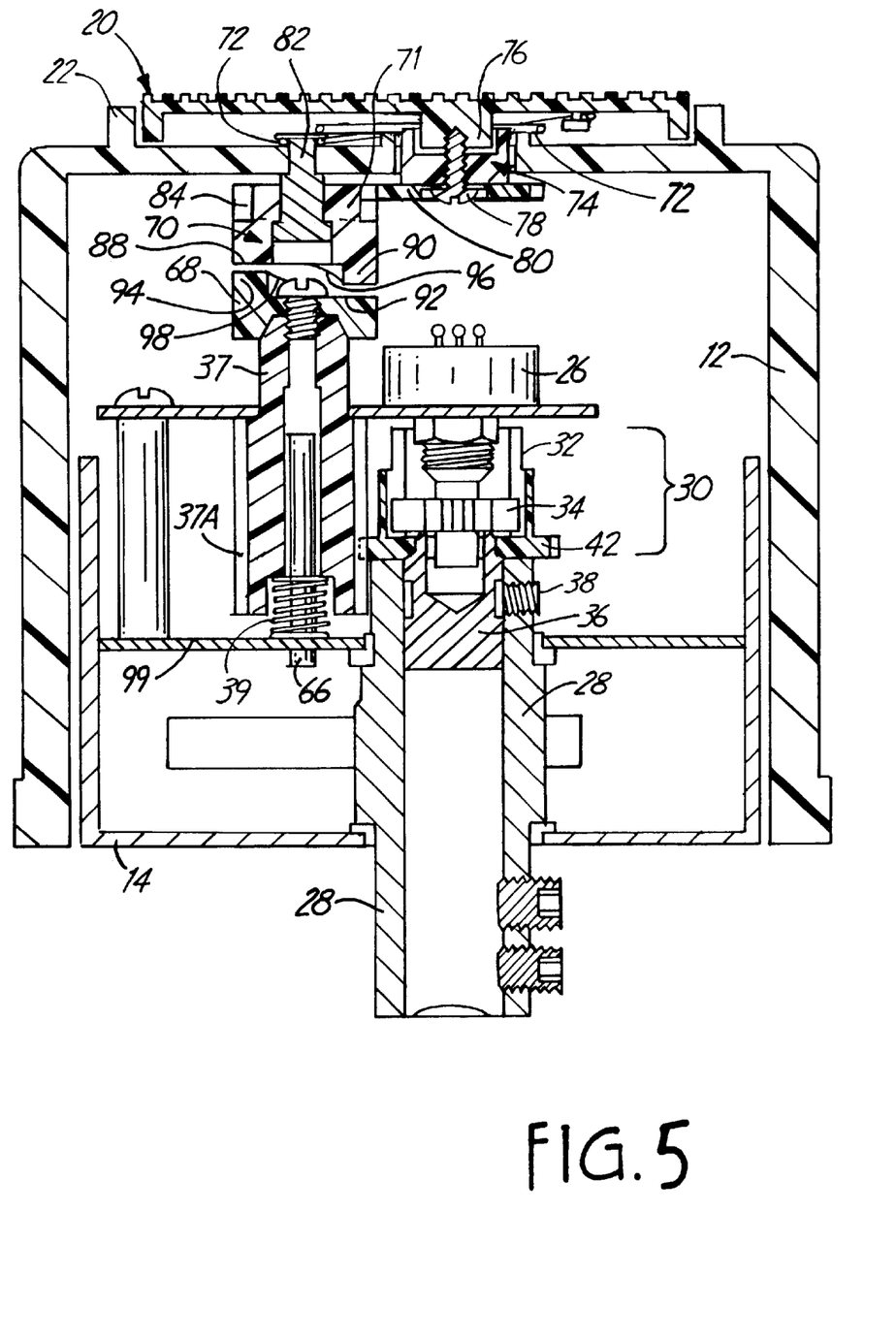
FIG. 5 is a sectional view of the actuator, as taken along lines 530 in FIG. 4.

FIG. 4 is a perspective view of the actuator showing the removal of outer cover 12 from the actuator mechanism. The visual indication of the position of the valve (not shown) is provided to the operator via the visual indicator dial 20 on outer cover 12. Actuator output hub 28 extends from the inner case 14 and potentiometer 26 and is rotatably coupled to a valve shaft 57. The rotation of visual indicator dial 20 is coupled to the position of the valve shaft 57 and actuator output hub 28 using female socket 32, gear column 37, pin 66, cam plate 68, cam 70, torsion spring 72, and dial attachment hub 74 as shown in FIG. 5.

Dial attachment hub 74 passes through an opening in outer cover 12 to connect with a hub portion 76 of the visual indicator dial 20. The connection is secured with set screw 78 or other equivalent attachment means. Dial attachment hub 74 also has an arcuate gear portion 80 inside of outer cover 12 (see FIG. 7). The gear portion 80 connects with the upper gear portion 84 of cam 70. A cam 70 is rotatably attached inside the outer cover 12 with pin 82 to define one end of a rotatable member or shaft 71, on an axis parallel to the dial 20, and has an upper gear portion 84 thereon in engagement with the arcuate gear portion 80 of the attachment hub 74. The exposed side of cam 70 has a face 88 with a raised shoulder 90. As seen in FIG. 5, the gear column 37 and cam 70 are preferably aligned coaxially.

Face 88 and shoulder 90 of cam 70 mate with cam plate 68, which is fixed to gear column 37 by a suitable fastener 68A. The exposed side of cam plate 68 has a face 92 with a raised shoulder 94. Shoulder 90 has a slope 96 and shoulder 94 has a slope 98. Shoulder 94 is a mirror image of shoulder 90 such that the slopes 96 and 98 align. As cam 70 is rotated in a first rotational direction (e.g. clockwise) relative to cam plate 68, the slope of the shoulders 90, 94 align and allow shoulder 90 of cam 70 to slide over and beyond shoulder 94 of cam plate 68. After clockwise rotation of shoulder 90 of cam 70 beyond shoulder 94 of cam plate 68, a counterclockwise relative bias between the cam 70 and cam plate 68 causes the faces 88, 92 of cam 70 and cam plate 68 to engage (interlock), allowing concerted rotation of cam 70 with cam plate 68 in the clockwise direction.

Spring 39 at the bottom of gear column 37 provides bias to cam plate 68 in the direction perpendicular to the plane of rotation (bias away from a base plate 99). Gear column 37 is aligned axially about on pin 66 on base plate 99, with the spring 39 there between. The bias provided by spring 39 in the direction perpendicular to the plane of rotation causes the faces and shoulders of cam 70 and cam plate 68 to remain in contact with each other as they rotate (in only one relative rotational position, when so urged together). Gear teeth 37A are provided along the outer cylindrical surface of gear column 37, and are aligned to engage the gear plate 42 of female socket 32. Accordingly, rotation of the female socket 32 causes rotation of the gear column 37.

Figure 6:
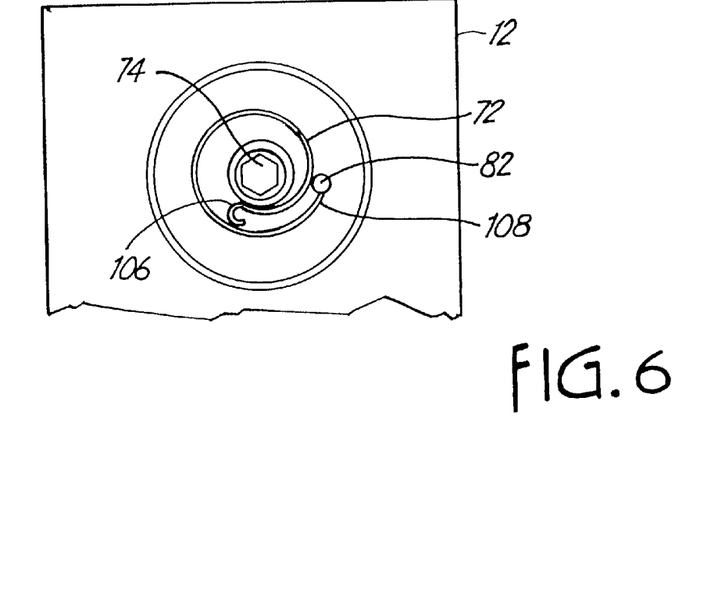
FIG. 6 is a plan view of the outside of the cover with the dial face removed.

FIG. 6 shows the top of the outer cover 12 with the visual indicator dial 20 removed. Torsion spring 72 has a first spring end 106 attached to the underside of visual indicator dial 20 and a second spring end 108 attached to the outer cover 12 at pin 82. The torsion spring 72 is coiled around attachment hub 74 and is sandwiched between visual indicator dial 20 and outer cover 12. Torsion spring 72 provides bias in the counterclockwise direction to the visual indicator dial 20. (and the arcuate gear portion 80 connected thereto).

The mechanism functions as follows: rotation of valve shaft 57 turns hub 28 which in turn rotates gear plate 42 of female socket 34. The gear plate 42 engages gear teeth 37A to rotate gear column 37 and attached cam plate 68. Shoulder 94 of cam plate 68 applies a rotational force counterclockwise against the raised shoulder 90 of cam 70, causing counterclockwise rotation of cam 70, including upper gear portion 84. The rotation of upper gear portion 84 causes the clockwise rotation of interlocked arcuate gear portion 80 of attachment hub 74. The connection between attachment hub 74 and visual indicator dial 20 causes the clockwise rotation of attachment hub 74 and visual indicator dial 20. Torsion spring 72 provides counterclockwise bias to visual indicator dial 20 and attachment hub 74, and clockwise bias to cam 70 through rotational connection.

Figure 7:
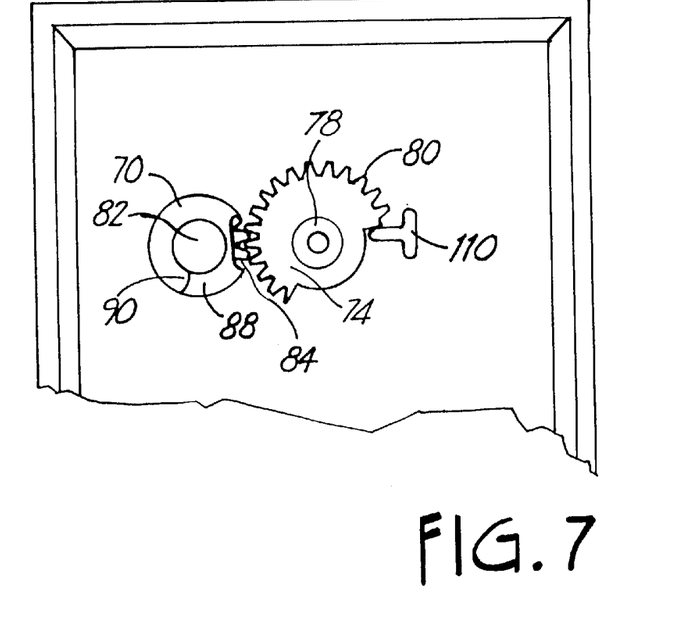
FIG. 7 is a bottom plan view of the inside of the outer cover of the actuator.

FIG. 7 is a view of the inside of the outer cover 12. When the outer cover 12 is removed, the engagement of shoulder 90 with shoulder 94 is disengaged, thus relieving the bias force between the shoulders 90 and 94, with the bias of torsion spring 72 causing rotation of the cam 70 and attachment hub 74 until the gear portion 80 of attachment hub 74 hits a stop 110 molded into the inside of the outer cover 12. Consequently, the readout of the position of cam plate 68 on the visual indicator dial is disrupted and is not directly coupled to the relative position of the hub 28.

Upon replacement of the outer cover 12, cam 70 and cam plate 68 are urged into contact through the action of spring 39. However, shoulders 90 and 94 of cam 70 and cam plate 68 are typically not engaged for coupled rotation (thus leading to inaccurate readout on the visual indicator dial 20). The alignment of the cam 70 and cam plate 68 is readily regained by manually turning the visual indicator dial 20 in the clockwise direction (causing the counterclockwise rotation of cam 70) until shoulder 90 on cam 70 passes shoulder 94 of the cam plate 68. An audible "click" is heard as the opposed faces 88, 92 of the cam 70 and cam plate 68 engage in a facing relationship. The dial 20 is then released. The bias of torsion spring 72 causes clockwise rotation of cam 70 until the face 88 of shoulder 90 engages the face 92 of shoulder 94. The cam 70 and cam plate 68 are again engaged for coupled rotation and the position of the valve (not shown) is accurately read out on the visual indicator dial 20.

Accuracy is achieved in the present invention to drive the potentiometer directly off of an output hub, which eliminates the backlash which can occur between gear stages. In so doing, there will be movement in the hub due to bearing clearances and end play. The inventive drive mechanism allows for movement in the X, Y, Z coordinate directions without that movement affecting the rotary coupling of the potentiometer to the output. The gear ratio between the engaged gear teeth on the gear plate 42 and gear column 37 is identical to the gear ratio between the gear teeth of upper gear portion 84 and arcuate gear portion 80 so that the visual indicator dial 20 turns at the same rate as the actuator output hub 28.

The actuator drive and display mechanism of the present invention provides an arrangement for reliably and accurately coupling two opposed (yet generally coaxial) shafts together for coupled rotation. The inventive mechanism permits limited relative movement of the shafts in the X, Y, and Z coordinates while retaining extremely tight (preferably within 0.05% positional accuracy) rotationally coupled tolerance. This enables the actuator to be used for precise rotational coupling in spite of axial and/or radial misalignments between the two shafts (thereby, for example, serving to minimize the effects of rotational backlash of the valve shaft which maybe translated to the potentiometer). The inventive actuator further includes an arrangement for easily resetting its visual indicator dial to a predetermined set point each time the unit is disassembled. The actuator of the present invention provides a versatile, easy to install and easy to calibrate mechanism for field coupling to a valve shaft or the like.

Although the present invention has been described with reference to preferred embodiments, workers skilled in the art will recognize that changes may be made in form and detail without departing from the spirit and scope of the invention. For example, while the invention is disclosed in an embodiment adapted for use on boiler valves, its application is not so limited. It is contemplated that the invention may be used in numerous other shaft-to-shaft coupling situations, such as applications on combustion air dampers, butterfly gas valves, oil modulation valves and flue gas recirculation systems.

What is claimed is:

1. A mechanism for rotatably coupling a first shaft and a second shaft in generally coaxial alignment, the mechanism comprising:

a female socket rotatably coupled to the first shaft, the socket having a generally cylindrical column section with a plurality of equally-spaced apart receiving channels defined on an inner circumferential side thereof, and a male fitting rotatably coupled to the second shaft, the male fitting having a plurality of radially extending arms thereon, with each arm having at least two circumferentially flexible fingers projecting radially therefrom, wherein the fingers of each arm are slidably received within a respective one of the receiving channels of the female socket, thereby connecting the first and second shafts for coupled rotation yet allowing limited relative movement of the first and second shafts in the X, Y and Z directions.

2. The mechanism of claim 1 wherein the plurality of equally-spaced apart receiving channels of the cylindrical column comprises four channels.

3. The mechanism of claim 1 wherein the male fitting has four equally spaced apart arms.

4. The mechanism of claim 1 wherein the second shaft is a rotary arm of a potentiometer.

5. The mechanism of claim 4 wherein the potentiometer achieves approximately 0.05% positional accuracy relative to the first shaft position.

6. The mechanism of claim 1 wherein the first shaft is an actuator output hub.

7. The mechanism of claim 1 wherein radially extending arms extend from a central ring on the male fitting.

8. The mechanism of claim 7 wherein the central ring connects the second shaft to the male fitting.

9. The mechanism of claim 1 wherein the female socket has a gear portion.

10. The mechanism of claim 9 wherein the gear portion is coupled to a visual indicator mechanism.

11. A mechanism for axially coupling a first shaft to a second shaft comprising:

a first shaft having a rotational axis and a free end;

a female socket seated on the free end of the first shaft, wherein the socket includes a column having a plurality of internal receiving channels oriented parallel to the rotational axis of the first shaft;

a second shaft having a rotational axis and a free end; and a male fitting seated on the free end of the second shaft, wherein the fitting has a plurality of fingers radiating perpendicular to the rotational axis of the second shaft, wherein at least two fingers are slidably received in each receiving channel to allow relative movement of the socket in the X, Y and Z directions.

12. A mechanism for rotatably coupling a first shaft and a second shaft in generally coaxial alignment, the mechanism comprising:

a female socket rotatably coupled to the first shaft, the socket having a generally cylindrical column section with a plurality of receiving channels defined on an inner circumferential side thereof; and a male fitting rotatably coupled to the second shaft, the male fitting having a plurality of radially extending arms thereon, each arm having an outer end with a plurality of flexible fingers, wherein the fingers of each arm are slidably received within a respective one of the receiving channels of the female socket, thereby connecting the first and second shafts for coupled rotation, and wherein the fingers of each arm are radially spaced from the inner circumferential side of the cylindrical column section to allow limited relative movement of the first and second shafts in the X, Y and Z directions.

13. The mechanism of claim 12 wherein there are an equal number of the plurality of receiving channels and the plurality of radially extending arms.

14. The mechanism of claim 13 wherein the plurality of receiving channels and the plurality of radially extending arms are equally spaced apart circumferentially.

15. The mechanism of claim 12 wherein there are four radially extending arms.

16. The mechanism of claim 12 wherein the first shaft is an actuator output hub.

17. The mechanism of claim 12 wherein the second shaft is a rotary arm of a potentiometer.

18. A coupling mechanism which comprises:

a cylindrical socket having a plurality of interior, longitudinal receiving channels extending along an interior circumference thereof; and a fitting including:
      a central ring, and
      a plurality of flexible fingers radiating outwardly from the central ring wherein each finger is slidably received within a respective receiving channel to allow relative movement of the socket in the X, Y and Z directions.

19. The coupling mechanism of claim 18, wherein the channels are equally spaced apart circumferentially.

20. The coupling mechanism of claim 18 wherein the fingers are equally spaced apart circumferentially.

21. The coupling mechanism of claim 18 wherein a gap is defined between each finger and the interior circumference of the cylindrical socket when the finger is received in its respective receiving channel.

* * * * *